US005846645A

United States Patent [19]

Yokota et al.

[11] Patent Number: 5,846,645

[45] Date of Patent: Dec. 8, 1998

[54] FLUOROCARBON RESIN-COATED PRODUCT

[75] Inventors: Masataka Yokota; Hiroshi Taya, both of Kawasaki; Renden Tashiro, Seki; Tooru Higo, Osaka, all of Japan

[73] Assignees: Asahi Glass Company Ltd., Tokyo; Creative Product Tashiro, Seki; Okuno Chemical Industries Co., Ltd., Osaka, all of Japan

[21] Appl. No.: 607,453

[22] Filed: Feb. 27, 1996

[30] Foreign Application Priority Data

Mar. 3, 1995 [JP] Japan .................................... 7-043940

[51] Int. Cl.[6] .............................. B32B 5/22; B32B 15/04; B32B 15/08; B32B 27/08

[52] U.S. Cl. .......................... 428/327; 428/421; 428/422; 428/457; 428/458

[58] Field of Search ..................................... 428/421, 422, 428/473, 474.4, 327, 457, 458; 427/409

[56] References Cited

U.S. PATENT DOCUMENTS

| | | | |
|---|---|---|---|
| 3,877,970 | 4/1975 | Edmonds, Jr. et al. | 427/379 |
| 3,904,575 | 9/1975 | Satokawa et al. | 260/32.8 R |
| 4,070,525 | 1/1978 | Vassiliou et al. | 428/422 |
| 4,351,882 | 9/1982 | Concannon | 428/422 |
| 4,353,950 | 10/1982 | Vassiliou | 428/195 |
| 4,421,795 | 12/1983 | Davies | 427/385.5 |
| 4,635,948 | 1/1987 | Zerfass et al. | 277/235 B |
| 4,853,278 | 8/1989 | Batzar | 428/213 |
| 5,009,959 | 4/1991 | Matsushita et al. | 428/419 |
| 5,246,782 | 9/1993 | Kennedy et al. | 428/421 |
| 5,433,913 | 7/1995 | Kawauchi et al. | 264/306 |

*Primary Examiner*—Vivian Chen
*Attorney, Agent, or Firm*—Oblon, Spivak, McClelland, Maier & Neustadt, P.C.

[57] ABSTRACT

A coated product having at least four coating layers comprising an undercoating layer formed by coating an undercoating material containing a fluorocarbon resin powder and an aromatic resin and having a viscosity of from 20 to 500,000 poise, an intermediate coating layer formed by coating an intermediate coating material containing a fluorocarbon resin powder and an inorganic pigment and having a viscosity of from 20 to 500,000 poise and a topcoating layer formed by coating a topcoating material containing a fluorocarbon resin powder and having a viscosity of from 20 to 500,000 poise, wherein the fluorocarbon resin powder in each coating layer has an average particle size of 0.1 to 40 $\mu$m.

5 Claims, No Drawings

FLUOROCARBON RESIN-COATED PRODUCT

BACKGROUND OF THE INVENTION

1. Field of the Invention

The present invention relates to a coated product formed by coating coating materials containing a fluorocarbon resin on a flat smooth surface of a metal to form a laminate which is excellent in long-lasting adhesion to the metal and which has markings or patterns applied thereto.

2. Discussion of Background

Coated products having a water-based coating material having a fluorocarbon resin such as a polytetrafluoroethylene dispersed therein, coated on a metal surface, are widely employed, including kitchen products such as a frying pan, a pot and a hot plate. However, the fluorocarbon resin has a characteristic that while it is excellent in the non-tackiness, chemical resistance and heat resistance, it has poor affinity with other materials, and it has been difficult to coat such a fluorocarbon resin directly on the metal surface. Accordingly, it has been common heretofore to roughen the metal surface by e.g. blasting or etching, and then coat a water-based coating material having a fluorocarbon resin dispersed therein, to improve the adhesion of the fluorocarbon resin coating layer to the metal surface. However, the surface of the coating layer has irregularities reflecting the roughened metal surface, whereby it has been difficult to apply markings or patterns clearly thereon. The present inventors have previously proposed a screen printing ink comprising a fluorocarbon resin as the main component (Japanese Unexamined Patent Publication No. 217470/1991), but no adequate durability in adhesion to a flat metal surface for a long period of time has thereby been attained.

SUMMARY OF THE INVENTION

It is an object of the present invention to coat a coating material containing a fluorocarbon resin on a flat, unroughened metal surface as a substrate to provide a coated product having a laminate excellent in the long-lasting durability in adhesion to the metal surface.

It has been found possible to maintain adhesion of the laminate to the metal surface of a substrate for a long period of time by incorporating an aromatic resin having good adhesion to a metal to the undercoating material to provide an adhesion property to the undercoating layer. Further, by incorporating only a fluorocarbon resin to the intermediate coating material and the topcoating material without adding the aromatic resin and incorporating to the intermediate coating material an inorganic pigment for markings or designs, it has been found possible to obtain a coating product comprising the topcoating layer and the intermediate coating layer having good adhesion to the undercoating layer. On the basis of these discoveries, the present invention has been accomplished.

To accomplish the above object, the present invention provides a coated product having at least three coating layers comprising an undercoating layer formed by coating an undercoating material containing a fluorocarbon resin and an aromatic resin and having a viscosity of from 20 to 500,000 poise, an intermediate coating layer formed by coating an intermediate coating material containing a fluorocarbon resin and an inorganic pigment and having a viscosity of from 20 to 500,000 poise and a topcoating layer formed by coating a topcoating material containing a fluorocarbon resin and having a viscosity of from 20 to 500,000 poise.

It is preferred that at least one of the undercoating material, the intermediate coating material and the topcoating material further contains a primary adhesive and/or a fluidizing agent. Namely, it is preferred to incorporate to at least one of the coating materials a fluidizing agent to provide a proper fluidity to the coating material at the time of coating, and a primary adhesive to secure the adhesion to the metal surface, the dimensional maintenance after preliminary drying and a proper level of viscosity of the coating material to secure a proper coating film thickness after the coating.

DETAILED DESCRIPTION OF THE PREFERRED EMBODIMENTS

The fluorocarbon resin to be used in the present invention is a polymer of a fluoroolefin such as tetrafluoroethylene or chlorotrifluoroethylene, or a copolymer of a fluoroolefin with a monomer copolymerizable with the fluoroolefin. Specifically, it is possible to employ a tetrafluoroethylene polymer (hereinafter referred to simply as PTFE), a tetrafluoroethylene/perfluoro(alkylvinyl ether) copolymer (hereinafter referred to simply as PFA), a tetrafluoroethylene/hexafluoropropylene copolymer, a tetrafluoroethylene/ethylene copolymer (hereinafter referred to simply as ETFE), a chlorotrifluoroethylene polymer, a chlorotrifluoroethylene/ethylene copolymer, a vinylidene fluoride polymer, or a vinyl fluoride polymer. It is preferred to employ a fluorocarbon resin in a powder form, so that the fluorocarbon resin can efficiently be dispersed in the process for preparing the coating material.

The average particle size of the fluorocarbon resin powder is preferably from 0.1 to 40 $\mu$m. If it is too small, the thixotropic properties tend to increase, whereby coating tends to be difficult. On the other hand, if the average particle size is too large, it becomes difficult to obtain a smooth surface, and clogging of a screen is likely to result during the screen printing.

The aromatic resin is preferably a thermoplastic polymer having aromatic rings such as benzene rings or naphthalene rings in the polymer main chain. For example, a polyimide resin, a polyamide resin, a polyamideimide resin, a polyether ether ketone resin, a polyether sulfone resin (hereinafter referred to simply as PES), a polyphenylene sulfide resin (hereinafter referred to simply as PPS), a polyoxybenzoyl resin, a polysulfone resin or a polyketone sulfide resin may be employed.

The blend ratio of the fluorocarbon resin to the aromatic resin in the undercoating material is preferably from 10/90 to 90/10 (wt %), more preferably from 10/90 to 50/50 (wt %). If the fluorocarbon resin is less than 10 wt %, no adequate adhesion to the intermediate layer can be obtained, and if the aromatic resin is less than 10 wt %, no adequate adhesion to the metal surface can be obtained.

The blend ratio of the fluorocarbon resin to the inorganic pigment in the intermediate coating material is preferably from 5/95 to 95/5 (wt %), more preferably from 40/60 to 90/10 (wt %). If the fluorocarbon resin is less than 5 wt %, the adhesion to the undercoating layer and to the topcoating layer tends to be impaired, and if the inorganic pigment is less than 5 wt %, coloring tends to be difficult.

The primary adhesive serves to impart thixotropic properties to each coating material and simultaneously impart an adhesive property during preliminary drying, and it is not required at the stage of baking the coating film, and if it remains, it tends to rather impair the adhesive property. Therefore, the primary adhesive is preferably the one which, when baked, will be thermally decomposed, converted to low molecular weight substances and dissipated, without being carbonized. Carbonization impairs the color of the baked coating and also impairs the adhesive property. Specifically, an acrylic resin such as polyisobutyl methacrylate, poly t-butyl methacrylate or polymethyl methacrylate, may be employed. Such a primary adhesive is used preferably in an amount of from 0.1 to 60 wt %, more preferably fro 0.1 to 30 wt %, relative to the solvent. If the amount is less than 0.1 wt %, the thixotropic properties tend to be inadequate, whereby no proper coating can be attained. On the other hand, if it exceeds 60 wt %, it tends to be difficult to maintain the shape of the laminate, and it will be difficult to obtain clear markings or patterns.

The fluidizing agent is used to provide proper fluidity to a coating material when a shearing force is exerted to the coating material at the time of coating and to maintain the shape of the laminate after the coating. It is preferably the one which, when baked, will be thermally decomposed and dissipated, without being carbonized. A cellulose type resin or a vinyl alcohol resin may, for example, be mentioned. Specifically, methyl cellulose, ethyl cellulose, acetyl cellulose, propyl cellulose, ethylhydroxyethyl cellulose, ethylhydroxypropyl cellulose, polyvinyl alcohol or polyvinyl pyrrolidone may, for example, be employed. The fluidizing agent is used preferably in an amount of from 0.1 to 40 wt %, more preferably from 0.1 to 20 wt %, relative to the solvent. If the amount is less than 0.1 wt %, no adequate fluidity will be obtained. On the other hand, if it exceeds 40 wt %, the fluidity tends to be impaired, whereby it will be difficult to obtain clear markings or patterns.

A solvent which will be evaporated or will be thermally decomposed and dissipated during baking, will be added to uniformly disperse the fluorocarbon resin powder into the coating material or to dissolve the aromatic resin, the primary adhesive or the fluidizing agent. Specific examples of such a solvent include glycol ethers and glycol esters. It is preferred to employ, for example, ethylene glycol dimethyl ether, ethylene glycol monomethyl ether, ethylene glycol monobutyl ether, diethylene glycol dimethyl ether, diethylene glycol monomethyl ether, diethyl glycol monoethyl ether, diethylene glycol monobutyl ether, diethylene glycol dibutyl ether, ethylene glycol monoacetate, ethylene glycol monopropionate, ethylene glycol diacetate, ethylene glycol dipropionate, ethylene glycol monomethyl ether acetate, ethylene glycol monoethyl ether acetate, ethylene glycol monobutyl ether acetate, diethylene glycol monoacetate, diethylene glycol monoethyl ether acetate, diethylene glycol monomethyl ether acetate, diethylene glycol monobutyl ether acetate, diethylene glycol, triethylene glycol, tetraethylene glycol, dipropylene glycol monoethyl ether or tripropylene glycol monomethyl ether. Further, other solvents such as α-terpineol (α,α,4-trimethyl-3-cyclohexene-1-methanol), pine oil, N-methyl-2-pyrrolidone, methyl isobutyl ketone, butyl acetate, ethyl acetate and isophorone, may, for example, be preferably employed.

As the inorganic pigment, a white pigment of $TiO_2$ type, a blue pigment of $CoO.Al_2O_3$ type, a black pigment of $CuO.Cr_2O_3$ type, a brown pigment of $Fe_2O_3$ type, ZnO type, $Al_2O_3.SiO_2$ type (glossy mica such as silver mica or gold mica), $MgO.SiO_2$ type, $ThO_2$ type, $Al_2O_3$ type, $SiO_2$ type, $CaSO_4$ type, $ZnSO_4$ type, $FeSO_4$ type, ZnS type, $CaCO_3$ type, $ZnCl_2$ type or $AlCl_3$ type, may, for example, be employed.

As the method for coating the coating materials in the present invention, it is possible to employ, for example, screen printing, air doctor coating, blade coating, rod coating, knife coating, pad coating, squeeze coating, dip coating, reverse roll coating, transfer roll coating, gravure coating, kissroll coating, cast coating, spray coating, curtain coating or calender coating. Screen printing is particularly preferably employed for coating the coating materials in the present invention, since coating materials having high viscosities can be coated by screen printing to readily form a clear laminate having a substantial film thickness and a large covering force, and screen printing can be carried out by a simple apparatus as compared with other coating methods. For such coating, coating materials having a viscosity of from 20 to 500,000 poise are used to obtain a laminate of at least three layers having a thickness of from 1 to 100 $\mu$m and with a clear coating film having no edge defects. If the viscosity is less than 20 poise, it tends to be difficult to obtain a proper coating layer thickness. On the other hand, if it exceeds 500,000 poise, the viscosity tends to be too high to conduct coating. Therefore, widely employed common PTFE water-based coating materials can not be used, since their viscosities are too low. The number of coating operations for each of the undercoating, intermediate coating and topcoating is at least once, i.e. each coating may be repeated in a plurality of times, as the case requires.

In order to improve the dispersion of the fluorocarbon resin powder, a surfactant may be added to the coating materials in the present invention, as the case requires. Further, an antioxidant may be added to prevent automatic oxidation of the resin components in the coating materials. Further, various additives such as a viscosity adjusting agent and a dispersion stabilizer, may be incorporated.

The laminate composed of a combination of the materials having the above-described constructions, formed by coating on a metal surface the coating materials having proper viscosities, thixotropic properties and fluidity, has a long-lasting adhesion to the metal surface, whereby clear markings or patterns may be applied thereon. Namely, when the coating material applied by undercoating, is baked, firstly, the solvent will be evaporated, then the primary adhesive and the resin component of the fluidizing agent will be thermally decomposed, and the aromatic resin and the thermoplastic fluorocarbon resin will be melted to form an undercoating layer firmly bonded to the metal surface. Here, coating can be done on any optional metal, for example, on a metal such as a stainless steel, aluminum, aluminum alloy, iron or zinc-plated steel plate with a high bonding force. On this undercoating layer, the intermediate coating material is coated and then the topcoating material is coated and baked, whereby in the intermediate coating like the undercoating, firstly the solvent will be evaporated, then the primary adhesive and the resin component of the fluidizing agent will thermally be decomposed, and the thermoplastic fluorocarbon resin will be melted to form the intermediate coating layer bonded to the undercoating layer, and the coating material for the topcoating will likewise form a topcoating layer bonded to the intermediate layer.

The coated product provided with the laminate thus formed by the coatings as described above has an excellent surface of the laminate as compared with a product coated with a conventional fluorocarbon resin coating material and is excellent in the long lasting adhesion, and it is useful at a place susceptible to heat and oil stains, for example, as a kitchen equipment such as a range hood fan or a gas table.

Specific products for which the coated product of the present invention may be employed, include, for example, kitchen related products such as a gas table, a range hood fan, a ventilator body, a ventilator fan, a kitchen wall, an inner wall and body of an oven, an inner wall and body of an oven toaster, a body and inner wall of an electronic oven, a flying pan, a hot plate, an inner container of a rice boiler, a mold for cakes, a bowl, a home bakery, a pan, a rice cake maker, a body of fuel supply equipment, a body of a water cleaner, an interior and exterior panels of a dryer for kitchen utensils, an inner wall of a jar or pot, a table frying pan, a kitchen knife and a pickling bucket; house hold electric equipments such as an iron, a hood and exterior packaging of an illuminator, an interior and exterior of a washing machine, an interior and exterior of a dryer for clothing, an electric fan, an exterior of an outdoor equipment of an air conditioner, an interior and exterior of a warm air heater and an audio panel; interior products such as a blind, a partition, a steel furniture, office equipments, ornaments, a sanitary interior and a toiletry interior; and outdoor products such as an exterior wall material, a roof material, a fence, a gate door, a mail post, a gutter, a tent, a shutter, a guardrail, a road sign, an interior of s ship, an outdoor advertisement, an outdoor drying equipment, a water tank, a fuel tank, a vehicle, a monument and an obje.

Now, the present invention will be described in further detail with reference to Examples. However, it should be understood that the present invention is by no means restricted by such specific Examples.

EXAMPLE 1

11 g of ethyl cellulose and 1 g of polyisobutyl methacrylate were dissolved at 80° C. in a solvent mixture comprising 44 g of diethylene glycol dibutyl ether and 44 g of α-terpineol to obtain an oil. To 20 g of this oil, 8 g of a PPS powder (Fortron, tradename, manufactured by Kureha Chemical) having an average particle size of 14.3 μm and 2 g of a PFA powder (TW3507, tradename, manufactured by Asahi Glass Company Ltd.) having an average particle size of 7 μm were preliminarily thoroughly kneaded and then passed twice through a triple roll mill to obtain an undercoating material. The viscosity of this coating material was 100 poise at room temperature.

Then, to 40 g of the above oil, 10 g of a PFA powder (JW2000 pulverized product, tradename, manufactured by Asahi Glass Company Ltd.) having an average particle size of 7 μm and 10 g of a PTFE powder (L-170J, tradename, manufactured by Asahi ICI Fluoropolymers) having an average particle size of 0.2 μm, and 20 g of a $TiO_2$ type white pigment were preliminarily thoroughly kneaded and then passed twice through a triple roll mill to obtain an intermediate coating material (1). The viscosity of this coating material was 640 poise. Further, an intermediate coating material (2) was prepared in the same manner with the same blending amounts except that 20 g of a $TiO_2$ type yellow pigment was used instead of the $TiO_2$ type white pigment in the intermediate coating material (1). The viscosity of this coating material was 340 poise at room temperature.

Then, to 45 g of the above oil, 21 g of a PFA powder (JW2000 pulverized product) having an average particle size of 7 μm and 9 g of a PTFE powder (L-170J) were preliminarily thoroughly kneaded and then passed twice through a triple roll mill to obtain a topcoating material. The viscosity of this coating material was 920 poise at room temperature.

Then, the undercoating material was screen-printed over the entire surface of a flat steel sheet through a screen mesh of 120 mesh, then dried at 150° C. for 10 minutes and baked at 320° C. for 6 minutes to form an undercoating layer. After cooling to room temperature, the intermediate coating material (1) was screen-printed over the entire surface on the undercoating layer through a screen of 180 mesh and dried at 150° C. for 10 minutes. Then, the intermediate coating material (2) was printed thereon in a pebbling pattern through a screen of 200 mesh and dried at 150° C. for 10 minutes. Further, the topcoating material was printed thereon through a screen of 150 mesh, dried at 150° C. for 10 minutes and then baked at 380° C. for 10 minutes, to obtain a coated product having a laminate comprising four layers thus formed. The thickness of the laminate was 21 μm. The coated product was excellent in the image clarity as well as the heat resistance and non-tackiness and exhibited an excellent performance over a long period of time with respect to the adhesion between the laminate and the steel sheet.

The test for adhesion was carried out in the following manner in accordance with JIS K-5400.

Namely, the coated product with its laminate cross-cut to form 100 squares of 1×1 mm, was immersed in boiling water for one hour, dried and then subjected to a peeling test with an adhesive tape, whereupon the attached condition of the cross-cut squares of the laminate was visually inspected. The 100 squares remained attached. Further, the coated product was immersed in a chlorine-type bleaching stock solution (Kitchen Hiter, tradename, Household Bleaching Agent) for 12 hours, whereupon the appearance of the laminate was inspected, and no change in the appearance was observed. This test corresponds to an acceleration test simulating use as a gas table for from 3 to 4 years.

EXAMPLE 2

Instead of the undercoating material in Example 1, an undercoating material was prepared by adding 4.2 g of a PPS powder (Fortron), 6 g of a PFA powder (TW3507) and 9.8 g of a PES powder (5003P, tradename, manufactured by ICI) having an average particle size of 20.1 μm, to 50 g of the oil. The viscosity was 370 poise. Otherwise, using the same intermediate coating material (1), intermediate coating material (2), topcoating material and coating mode as in Example 1, a coated product having a laminate with a thickness of 20 μm was prepared. The properties of the coated product were the same as in Example 1.

EXAMPLE 3

Instead of the undercoating material in Example 1, an undercoating material was prepared by adding 14 g of a PES powder (5003P) and 6 g of a PFA powder (TW3507) to 60 g of the oil. The viscosity was 1570 poise. Otherwise, using the same intermediate coating material (1), intermediate coating material (2), topcoating material and coating mode as in Example 1, a coated product having a laminate with a thickness of 22 μm was prepared. The properties of the coated product were the same as in Example 1.

EXAMPLE 4

Instead of the intermediate coating material (1) in Example 1, an intermediate coating material (1) was prepared by adding 12.6 g of a PFA powder (JW2000, pulverized product), 12 g of a PTFE powder (L-170J) and 5.4 g of a $TiO_2$ type white pigment to 30 g of the oil. The viscosity was 420 poise. Otherwise, using the same undercoating material, intermediate coating material (2), topcoating material and coating mode as in Example 1, a coated product having a laminate with a thickness of 21 μm was prepared. The properties of the coated product were the same as in Example 1.

EXAMPLE 5

Instead of the intermediate coating material (1) in Example 1, an intermediate coating material (1) was prepared by adding 10 g of a PFA powder (JW2000, pulverized product) and 10 g of a $TiO_2$ type white pigment, to 20 g of the oil. The viscosity was 460 poise. Otherwise, using the same undercoating material, intermediate coating material (2), topcoating material and coating mode as in Example 1, a coated product having a laminate with a thickness of 20 μm was prepared. The properties of the coated product were the same as in Example 1.

EXAMPLE 6

Instead of the topcoating material in Example 1, a topcoating material was prepared by adding 10 g of a PFA powder (JW2000, pulverized product) and 10 g of a PTFE powder (L-170J), to 60 g of the oil. The viscosity was 110 poise. Otherwise, using the same coating material, intermediate coating material (1), intermediate coating material (2) and coating mode as in Example 1, a coated product having a laminate with a thickness of 20 μm was prepared. The properties of the coated product were the same as in Example 1.

EXAMPLE 7

Instead of the topcoating material in Example 1, a topcoating material was prepared by adding 30 g of a PFA powder (TW3530) having an average particle size of 30 μm to 15 g of the oil. The viscosity was 2270 poise. Otherwise, using the same undercoating material, intermediate coating material (1), intermediate coating material (2) and coating mode as in Example 1, a coated product having a laminate with a thickness of 22 μm was prepared. The properties of the coated product were the same as in Example 1.

EXAMPLE 8

Instead of the intermediate coating material (1) in Example 1, an intermediate coating material (1) was prepared by adding 10 g of a PTFE powder (J-170J) and 10 g of a $TiO_2$ type white pigment, to 20 g of the oil. The viscosity was 480 poise. Further, instead of the intermediate coating material (2) in Example 1, an intermediate coating material (2) was prepared by adding 10 g of a PTFE powder (L-170J, tradename, manufactured by Asahi ICI Fluoropolymers) and 10 g of a $TiO_2$ type yellow pigment, to 20 g of the oil. Further, instead of the topcoating material, a topcoating material was prepared by adding 30 g of a PTFE powder (L-170J) to 30 g of the oil. The viscosity was 540 poise. Otherwise, using the same undercoating material and coating mode as in Example 1, a coated product having a laminate with a thickness of 22 μm was prepared. The properties of the coated product were the same as in Example 1.

EXAMPLE 9

To 150 g of the oil used in Example 1, 100 g of an ETFE powder (Aflon LM740, tradename, manufactured by Asahi Glass Company Ltd.) having an average particle size of 7 μm and 10 g of a PES powder (5003P) were added, and the mixture was preliminarily thoroughly kneaded and then passed twice through a triple roll mill to obtain an undercoating material. The viscosity of this coating material was 390 poise at room temperature.

Then, 9 g of a $CaCO_3$ type blue pigment, 3 g of a $TiO_2$ type white pigment and 24 g of an ETFE powder were preliminarily thoroughly kneaded to 72 g of the above oil and then passed twice through a triple roll mill to obtain an intermediate coating material (1). The viscosity of this coating material was 640 poise at room temperature. Further, 15 g of silver mica and 85 g of an ETFE powder were preliminarily thoroughly kneaded to 200 g of the above oil and then passed twice through a triple roll mill to obtain an intermediate coating material (2). The viscosity of this coating material was 190 poise at room temperature. Further, 50 g of an ETFE powder was added to 75 g of the above oil, and the mixture was preliminarily thoroughly kneaded and then passed twice through a triple roll mill to obtain a topcoating material. The viscosity of this coating material was 380 poise at room temperature.

Then, the undercoating material was screen-printed over the entire surface on a smooth flat steel sheet through a screen with 150 mesh and dried at 150° C. for 10 minutes to form an undercoating layer. After cooling it to room temperature, the intermediate coating material (1) was printed in a pebbling pattern on the undercoating layer through a screen with 120 mesh and dried at 150° C. for 10 minutes. Further, the intermediate coating material (2) was printed in a fine pebbling pattern thereon through a screen with 150 mesh and dried at 150° C. for 10 minutes. Finally, the topcoating material was printed over the entire surface through a screen with 120 mesh, dried at 150° C. for 10 minutes and then baked at 350° C. for 10 minutes, to obtain a coated product having a laminate comprising four layers. The coated product was excellent in the clarity of an image by two color printing, heat resistance and non-tackiness and exhibited excellent performance for a long period of time with respect to the adhesion of the laminate to the steel sheet. The thickness of the laminate was 22 μm.

EXAMPLE 10

Instead of the undercoating material in Example 1, an undercoating material was prepared by adding 10 g of a polyamideimide powder (Toron, tradename, manufactured by Mitsubishi Chemical Corporation) and 10 g of a PFA powder (TW3507), to 60 g of the oil. The viscosity was 1120 poise. Otherwise, using the same intermediate material (1), intermediate coating material (2), topcoating material and coating mode as in Example 1, a coated product having a laminate with a thickness of 23 μm was prepared. The properties of the coated product were the same as in Example 1.

COMPARATIVE EXAMPLE 1

The topcoating material used in Example 1 was printed over the entire surface on a smooth flat steel sheet through a screen with 150 mesh, dried at 150° C. for 10 minutes and then baked at 380° C. for 10 minutes, to obtain a coated product. The adhesion of the coated film to the steel sheet was inadequate, and remaining cross-cut squares were 53. When the coated product was immersed in a chlorine type bleaching stock solution for 12 hours, blistering resulted in the coated film.

As described in the foregoing, according to the present invention, by coating on a smooth flat metal surface, the undercoating material with high viscosity containing a fluorocarbon resin and an aromatic resin, the intermediate coating material with high viscosity containing a fluorocarbon resin and an inorganic pigment and the topcoating material with high viscosity containing a fluorocarbon resin, it is possible to obtain a coated product which is excellent in the surface non-tackiness and the durability for a long period of time in adhesion of the laminate to the metal surface and to which clear markings or patterns may be applied.

What is claimed is:

1. A coated product having at least four coating layers comprising a metal substrate having a flat smooth surface, that has not been subjected to roughening treatment, coated by an undercoating layer formed by coating an undercoating material having a viscosity of from 20 to 500,000 poise containing a fluorocarbon resin powder and an aromatic resin, at least two intermediate coating layers formed by coating at least two intermediate coating materials having a viscosity of from 20 to 500,000 poise containing a fluorocarbon resin powder and an inorganic pigment and a topcoating layer formed by coating a topcoating material having a viscosity of from 20 to 500,000 poise containing a fluorocarbon resin powder, said fluorocarbon resin powder in each coating material having an average particle size of from 0.1 to 40 $\mu$m and each of said coating layers being formed by screen-printing.

2. The coated product according to claim 1, wherein at least one of the undercoating material, the intermediate coating materials and the topcoating material further contains at least one member selected from the group consisting of a primary adhesive and a fluidizing agent.

3. The coated product according to claim 1, wherein the fluorocarbon resin is selected from the group consisting of a tetrafluoroethylene polymer, a tetrafluoroethylene/perfluoro (alkylvinyl ether) copolymer, a tetrafluoroethylene/hexafluoropropylene copolymer, a tetrafluoroethylene/ethylene copolymer, a chlorotrifluoroethylene polymer, a chlorotrifluoroethylene/ethylene copolymer, a vinylidene fluoride polymer, and a vinyl fluoride polymer.

4. The coated product according to claim 1, wherein the aromatic resin is a thermoplastic resin containing aromatic rings in the main chain.

5. The coated product according to claim 4, wherein the aromatic resin is selected from the group consisting of a polyimide resin, a polyamide resin, a polyamideimide resin, a polyether ether ketone resin, a polyether sulfone resin, a polyphenylene sulfide resin, a polyoxybenzoyl resin, a polysulfone resin, and a polyketone sulfide resin.

* * * * *

UNITED STATES PATENT AND TRADEMARK OFFICE

CERTIFICATE OF CORRECTION

PATENT NO. : 5,846,645
DATED : December 8, 1998
INVENTOR(S) : Masataka YOKOTA et al.

It is certified that error appears in the above-identified patent and that said Letters Patent is hereby corrected as shown below:

On the title page, item [75] the second Inventor's name should be:

--Hirosi Taya--

Signed and Sealed this

Seventeenth Day of August, 1999

Attest:

Q. TODD DICKINSON

*Attesting Officer*

*Acting Commissioner of Patents and Trademarks*